US012418584B1

(12) United States Patent
Širokov et al.

(10) Patent No.: US 12,418,584 B1
(45) Date of Patent: Sep. 16, 2025

(54) COMPUTER-IMPLEMENTED METHOD AND A SYSTEM FOR SYNCHRONIZING DATA MESSAGES BETWEEN MULTIPLE NETWORK NODES OF A COMMUNICATION NETWORK

(71) Applicant: Wayren OÜ, Tallinn (EE)

(72) Inventors: Martin Širokov, Tallinn (EE); Oliver Tiit, Tallinn (EE)

(73) Assignee: Wayren OÜ, Tallinn (EE)

( * ) Notice: Subject to any disclaimer, the term of this patent is extended or adjusted under 35 U.S.C. 154(b) by 0 days.

(21) Appl. No.: 18/663,358

(22) Filed: May 14, 2024

(30) Foreign Application Priority Data

Mar. 18, 2024 (EP) ..................................... 24164164

(51) Int. Cl.
*H04L 67/1095* (2022.01)
(52) U.S. Cl.
CPC ................ *H04L 67/1095* (2013.01)
(58) Field of Classification Search
None
See application file for complete search history.

(56) References Cited

U.S. PATENT DOCUMENTS

| | | | |
|---|---|---|---|
| 10,362,105 B1 | 7/2019 | DeMarco | |
| 2020/0059376 A1 | 2/2020 | Slovetskiy | |
| 2021/0281641 A1* | 9/2021 | Baron | ..................... H04L 47/34 |
| 2022/0100618 A1* | 3/2022 | Jain | ..................... G06F 11/1464 |
| 2023/0177481 A1* | 6/2023 | Motlagh | ................. H04L 63/08 |
| | | | 705/51 |
| 2024/0211444 A1* | 6/2024 | Yerfule | ................... G06F 16/13 |

OTHER PUBLICATIONS

Ciglan et al., "Content Synchronization in Replicated Grid Database Resources", Oct. 4, 2008, IEEE, 2007 Third International IEEE Conference on Signal-Image Technologies and Internet-Based System (2007, pp. 379-386) (Year: 2008).*
European Patent Office, Extended European Search Report, Application No. 24164164.6, mailed Jul. 4, 2024, 8 pages.
Nygaard et al., "SNIPS: Succinct Proof of Storage for Efficient Data Sychronization in Decentralized Storage Systems" ARXIV.org, Cornells University Library, Apr. 10, 2023, XP091481564, 14 pages.

* cited by examiner

*Primary Examiner* — Davoud A Zand
(74) *Attorney, Agent, or Firm* — Ziegler IP Law Group LLC.

(57) ABSTRACT

Disclosed is a computer-implemented method for synchronizing data messages between multiple network nodes of a network. The multiple network nodes include a first network node and second network nodes. The method includes installing a data exchange platform in the first network node and in the second network nodes, wherein the data exchange platform has, a messaging API, a transport plugin interface, and a synchronization protocol; providing a set of transport plugins, to at least one network node of the multiple network nodes; identifying second network nodes requesting to synchronize the one or more data messages and the data messages to be synchronized; and implementing the synchronization protocol for synchronizing the data messages between the first network node and the second network nodes by transferring the data messages from the first network node to the second network nodes.

15 Claims, 3 Drawing Sheets

COMPUTER-IMPLEMENTED METHOD AND A SYSTEM FOR SYNCHRONIZING DATA MESSAGES BETWEEN MULTIPLE NETWORK NODES OF A COMMUNICATION NETWORK

TECHNICAL FIELD

The present disclosure relates to data synchronization between multiple network nodes in a communication network, more specifically, to methods systems, and computer program products for synchronizing one or more data messages between network nodes and to database replication methods.

BACKGROUND

In unreliable networks with high packet loss and low data rates, ensuring data replication is a significant challenge due to the need for acknowledgement mechanisms, that are required to make sure data has been successfully delivered. The known solutions rely on conventional acknowledgement mechanisms that are not well suited for high packet loss or low data rate networks. Replication involves maintaining multiple copies of data across different nodes, with each node comparing and updating its copy based on messages received from other nodes.

In unreliable networks, messages may be lost due to packet loss.

Conventional acknowledgement methods may try to send data again right away, even if the data was successfully delivered, but acknowledgement was lost due to packet loss. This causes unnecessary traffic and network congestion. In such networks, need to wait for reply from other nodes will degrade performance significantly.

In unreliable networks, nodes can fail or be offline frequently, leading to inconsistent state between nodes. This requires comparing states between nodes to occur periodically. Conventional methods use hashes to compare state, but due to potentially large amounts of data needed to compare state between 2 nodes, data rate might not be sufficient enough to prevent network congestion.

In unreliable networks, data security is a significant concern due to the risk of data interception and tampering. Techniques for securing data during synchronization, such as encryption, can add additional overhead and complexity to the synchronization process. The known solutions have drawbacks such as increased computational overhead and latency, as well as the complexity of managing security protocols, which can strain resources and complicate system scalability and performance. Data synchronization in unreliable networks with high data loss and low speeds is thus a complex problem that requires techniques to ensure consistency, scalability, fault tolerance, and security.

Therefore, considering the problems related to the data synchronization in unreliable networks, there exists a need how to synchronize data efficiently between multiple nodes in unreliable and slow networks.

SUMMARY

The aim of the present disclosure is to provide a solution how to synchronize data efficiently between multiple nodes in unreliable and slow networks.

The aim of the present disclosure is achieved by a method, a data exchange platform, a system, a computer program product, a database replication method, and a distributed database system for synchronizing one or more messages between multiple network nodes of a communication network as defined in the appended independent claims to which reference is made to. Advantageous features are set out in the appended dependent claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the embodiments of the disclosure are shown in the drawings, with references to the following diagrams wherein.

DETAILED DESCRIPTION OF EMBODIMENTS

Figure 1:
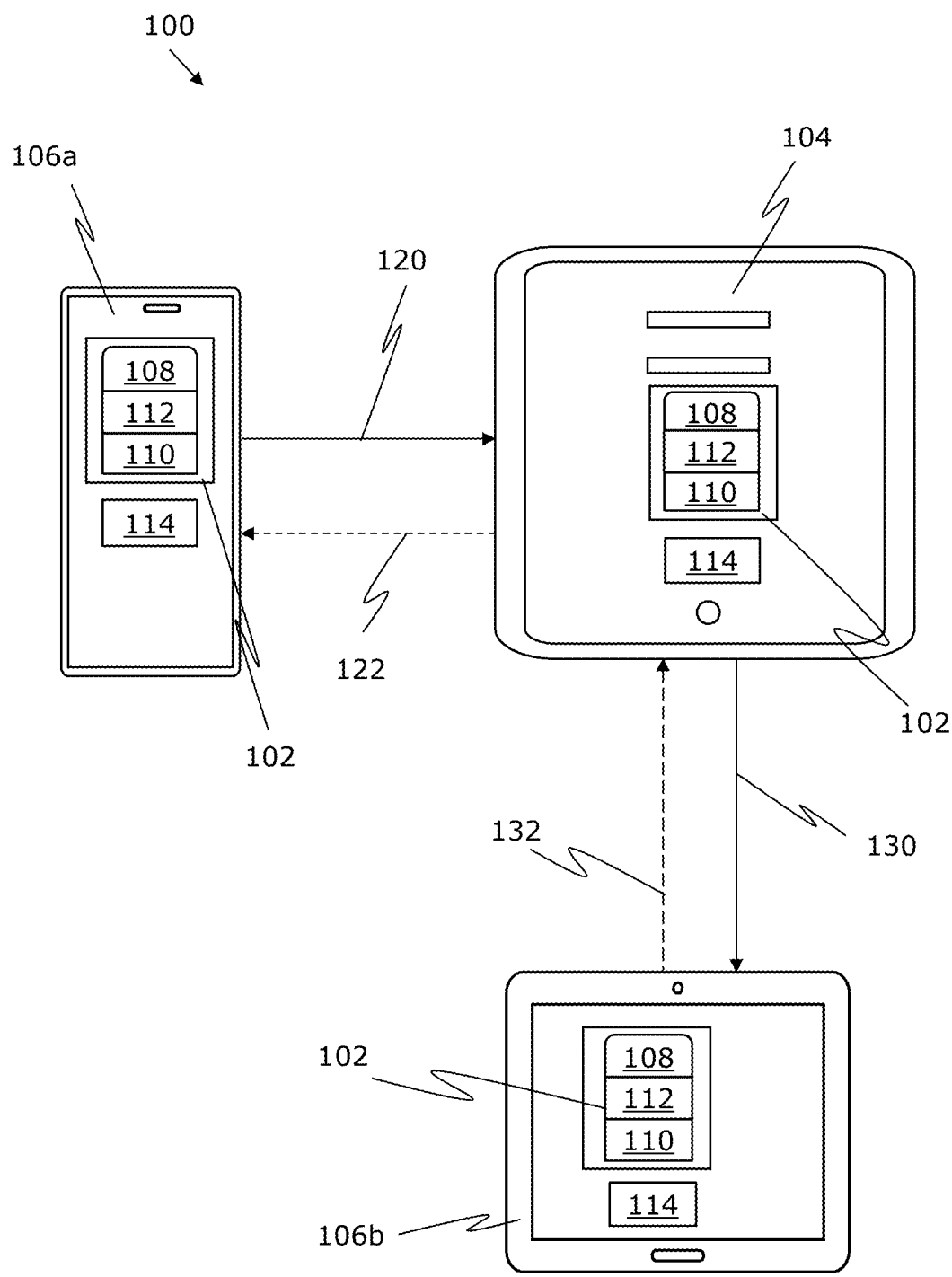
FIG. 1 illustrates a system architecture and synchronization method, according to an embodiment of the present disclosure.

The following detailed description illustrates embodiments of the present disclosure and ways in which they can be implemented. embodiment In an aspect, the present disclosure provides a computer-implemented method for synchronizing one or more data messages between multiple network nodes of a communication network, wherein the multiple network nodes comprise a first network node and one or more second network nodes and wherein the one or more data messages to be synchronized comprises a payload tagged with metadata, the method comprises: installing a data exchange platform from a storage medium in the first network node and in the one or more second network nodes according to a communication network plan, wherein the data exchange platform comprises a messaging Application Programming Interface (API), a transport plugin interface, and a synchronization protocol with a transport adaptation layer comprising an Approximate Membership Query (AMQ) filter and a Merkle tree; providing a set of transport plugins, activated and configured by pre-defined configuration, to at least one network node of the multiple network nodes; identifying, by the data exchange platform of the first network node, the one or more second network nodes requesting to synchronize the one or more data messages and the one or more data messages to be synchronized; and implementing the synchronization protocol for continuously synchronizing the one or more data messages between the first network node and the one or more second network nodes by transferring the one or more data messages to be synchronized from the first network node to the identified one or more second network nodes which requested the one or more data messages.

In another aspect, the present disclosure provides a system for synchronizing one or more data messages between multiple network nodes of a communication network, the system comprising a data exchange platform installable in the multiple network nodes of the communication network and a set of transport plugins installable in the multiple network nodes of the communication network, wherein the data exchange platform is configured to continuously synchronizing the one or more data messages between the multiple network nodes of the communication network and each transport plugin of a set of transport plugins is configured to adapt the data exchange platform for the multiple network nodes. Optionally, the system may further comprise user interfaces or monitoring tools configured to manage and monitor the synchronization process between the network nodes.

The network node refers to a portable computer (e.g., mobile device, PC, laptop, server) that participates in the communication network. The first network node and the one or more second network nodes each may comprise one or more applications or can be without applications. The network node may be a gateway node with more than one network groups where devices communicate or a single node with one network group where devices communicate.

The embodiments according to the present disclosure facilitate data synchronization between multiple network nodes of a communication network. The data synchronization is achieved using the data exchange platform installed in a first network node and one or more second network nodes of the communication network. The method and system according to the present disclosure thus provide an efficient solution for synchronizing data between multiple nodes in an unreliable and slow heterogeneous communication networks by ensuring that data messages are kept consistent across all nodes while minimizing network usage and ensuring reliability even when some nodes or the network itself may be unavailable. The present method and system enable in heterogeneous, slow, and unreliable networks, to overcome several data synchronization challenges.

Such networks, which are facing significant challenges due to slow and unreliable communication, are for example wireless sensor networks (WSNs), Internet of Things (IoT) networks, distributed database systems, satellite communication networks, and peer-to-peer networks. These networks, characterized by their diverse node capabilities, protocols, and environmental conditions, require robust synchronization methods to maintain data consistency and support real-time responsiveness. In real-life applications, such as environmental monitoring, healthcare, industrial automation, military operations, and financial services, efficient synchronization ensures accurate, up-to-date information, minimizing energy consumption and resource usage.

The use of the data exchange platform installed on all network nodes enables uniformity in the synchronization process across different nodes.

This, in turn, simplifies the management and maintenance of data consistency by providing a consistent interface and set of tools for handling data synchronization.

The communication network plan refers to the guidelines that dictate how the data exchange platform and transport plugins are installed and configured in each node of the communication network. The communication network plan ensures that all nodes follow consistent installation procedures, reducing the risk of errors or inconsistencies across the network. The "activated and configured by pre-defined configuration" refers to the automated process of installing and setting up the data exchange platform and transport plugins according to this communication network plan. Pre-defined configurations are settings that can be applied to each network node, ensuring that all network nodes are configured correctly and consistently. The advantages of using a pre-defined configuration include the following. By automating the installation and configuration process, it becomes easier to deploy the data exchange platform and transport plugins across multiple network nodes, saving time and reducing the risk of human error. Pre-defined configurations ensure that all nodes are configured identically, reducing the likelihood of compatibility issues or inconsistencies between nodes. The use of pre-defined configurations enables administrators to manage and update node configurations centrally, allowing for easier maintenance and management of the communication network as a whole. By following standardized installation procedures and configuration settings, organizations can reduce the risk of vulnerabilities or misconfigurations that could be exploited by attackers. Pre-defined configurations help streamline the process of adding new nodes to the communication network, making it easier to scale the network as the organization grows or its needs change. The communication network plan and the use of pre-defined configurations help ensure that the data exchange platform and transport plugins are installed and configured consistently across all nodes in the communication network, enabling more efficient and effective data synchronization while reducing the risk of errors, inconsistencies, or security vulnerabilities.

The data exchange platform detects non-delivery or erroneous delivery of fragments of data messages to one or more second network nodes. The data exchange platform utilizes a synchronization protocol for encoding the fragments of data that may be missing from memory of the one or more second network nodes. The encoding may be such that fragments of data can be seamlessly transferred to the one or more second network nodes irrespective of communication protocols or hardware that may be used for the transfer. The data exchange platform transmits the fragments of data to the one or more second network nodes using transport plugins.

The data exchange platform enables interoperability of applications installed in the multiple network nodes, which is based on abstraction of technical specifications such as communication protocols used for transfer of data generated by the applications, and hardware and/or software specifications of networking components involved in data transmission and reception. This abstraction allows applications to communicate effectively despite differences in their underlying technical specifications. Thus, the data exchange platform allows usage of non-standard networking equipment to transmit and receive data belonging to different applications without having to modify the applications. The applications installed in a particular network node or different network nodes may communicate with each other via an application programming interface of the data exchange platform. The data exchange platform, being data agnostic, enables an application to generate data, queue the generated data for transmission, or receive any data generated by other applications, regardless of whether the application can support different underlying networking hardware and protocols, and associated configuration.

The applications of the network nodes may use the data exchange platform for performance of data operations such as transmission, subscription, querying, monitoring, and so on. The data, to be transmitted, may be tagged with metadata such as association of the data with a particular virtual channel, priority, expiry timestamp, and other parameters. This enables a synchronization protocol to determine a timestamp for data transfer, an intended recipient network node, and means for transferring data to the intended recipient. On data reception from an application, the data exchange platform ensures that the data is transmitted, and that the data is resent if it is determined the data has not been received by an intended recipient. The data exchange platform efficiently synchronizes data and routes the data to applications installed on network nodes that may request for the data, handle and/or bridge different network types, and provide encryption capabilities. The data exchange platform enables improving network performance and allows unified tools for configuration and monitoring.

The data exchange platform may function as a distributed database. Such functioning is essential when the network nodes are offline for extended time periods and require resynchronization when the network nodes switch from the offline state to an online state. Additionally, the functionality may allow avoiding single points of failure. This is so because data can be distributed to multiple network nodes and an impact due a network node switching to the offline state (from the online state) is likely to be minimum.

The data exchange platform may optimize data exchange in challenging scenarios where packet loss is high (for example, a scenario where the packet loss is greater than 30%). The data exchange platform prevents rapid degradation of network performance in such scenarios and enables a network to continue functioning at higher packet loss rates and higher latency. This is because, the data exchange platform causes the network performance to deteriorate in proportion (rather than rapid deterioration) to an increase in the packet loss rate or latency.

The data exchange platform is installed from a storage medium in the first network node and in the one or more second network nodes according to a prepared communication network plan. The data exchange platform comprises the messaging API, the transport plugin interface, and the synchronization protocol with a transport adaptation layer comprising an AMQ filter. The data exchange platform enables exchange of data between the multiple network nodes by abstracting technical specifications (i.e., software, protocol, or hardware configurations) associated with the software, the protocol, and the hardware, involved in the exchange of data.

The messaging API enables applications, installed in the multiple network nodes, to send or receive messages of any data type or format by integrating messaging capabilities in the multiple network nodes. The messaging API facilitates querying for messages and storing transmitted messages temporarily in queues until the transmitted messages have been processed at recipient network nodes. The messaging API may be configured to determine states of the communication network, monitor the states of the communication network, and ensure that communications between the applications are secure and reliable. The security may be ensured using access control mechanisms. The reliability may be ensured using transmission of acknowledgements. The messaging API allows nodes to communicate effectively with each other, ensuring that data is transmitted and received correctly and efficiently. This is essential in heterogeneous networks where different nodes may have varying capabilities and configurations.

The set of transport plugins may comprise one or more transport plugins The set of transport plugins is activated and configured by a pre-defined configuration, is provided to at least one network node of the multiple network nodes. The use of transport plugins allows the system to dynamically adjust to changing network conditions and node configurations, ensuring that the data exchange platform remains effective even as the network evolves over time. This flexibility is crucial for maintaining data consistency in complex, heterogeneous networks where conditions may change frequently or unpredictably.

The transport plugins may drive the transport plugin interface. The transport plugin interface is a configurable API and an integral part of the data exchange platform. The transport plugin interface may further include a stable Application Binary Interface (ABI) that enables the synchronization protocol to support nonstandard communication equipment. The ABI allows the data exchange platform users and/or third party developers extend the data exchange platform with support for nonstandard communications equipment.

The transport plugin interface enables the adaptation of the data exchange platform to different network conditions and node configurations by allowing developers to create custom plugins tailored to specific requirements. This flexibility helps maintain compatibility and optimize performance across various network technologies in the network.

The transport adaptation layer is an important component within the synchronization protocol of the data exchange platform that plays several essential roles. Its primary role is to interact with and adapt to various transport plugins installed in different network nodes, ensuring that efficient data synchronization between those nodes can be maintained regardless of their specific network conditions or requirements. The transport adaptation layer is configured to interact with and adapt to various transport plugins installed in different network nodes, allowing efficient data synchronization between the network nodes regardless of specific network conditions or requirements. This flexibility enables the system to effectively manage the unreliable and slow communication networks and maximize synchronization efficiency. The adaptation layer is further responsible for encryption and send encrypted data to the respective transport plugins. By performing encryption at this level, the system ensures that sensitive information is protected during transmission between nodes. All transport plugins can be arranged to utilize the transport adaptation layer if needed. This standardization allows for easier integration with the data exchange platform. If the transport plugin lacks certain features including but not limited to encryption, traffic-shaping, or failover policies, the adaptation layer is arranged to provide the necessary functionality and ensure that the appropriate messages are sent to and received from other network nodes when needed. The interface between the transport plugins and the transport adaptation layer takes into account what the adaptation layer specifies for data transmission, ensuring a seamless flow of information between the layers and maintaining consistent synchronization across the communication network.

The transport plugin is configured to connect to relevant communications equipment (using OS-specific APIs), to configure the communications equipment, to transmit datagrams over the communications equipment. The transport plugin may optionally be configured to ensure confidentially and authenticity of datagrams, to apply traffic-shaping policies, to identify senders of datagrams by some technology-specific addressing scheme, which can be built with no modifications to underlying hardware or protocol stacks and may be built-in with the underlying communications technology. To ensure confidentially and authenticity of datagrams, it may be implemented using IPSEC. To apply traffic-shaping policies it may be done by dedicated routers.

Alternatively, if data exchange platform is configured to ensure confidentially and authenticity of datagrams, to apply traffic-shaping policies, to identify senders of datagrams by some technology-specific addressing scheme, the transport plugin may be configured to request some of those functions to be offloaded to it. The use of a synchronization protocol with an Approximate Membership Query (AMQ) filter helps improve efficiency by reducing unnecessary data transfers, and preserving bandwidth. The use of a synchronization protocol with the AMQ filter complements existing packet networks by reducing the amount of data that needs to be transferred between nodes. By utilizing compression and efficient data representation techniques, AMQ helps minimize unnecessary data transfers, and preserving bandwidth in unreliable networks. This is crucial for communication networks where bandwidth may be limited or inconsistent, as it allows the system to maximize synchronization efficiency while still maintaining reliable data transfer. This is particularly important in unreliable networks where bandwidth may be limited or inconsistent, making it crucial to minimize the amount of data that needs to be transferred between nodes. I.e., the AMQ filter helps to improve efficiency of comparing states of two or more network nodes.

The continuous synchronization ensures that updates are propagated to all nodes as efficiently and reliably as possible, allowing for data consistency even in challenging network conditions. This is essential sending and receiving mission critical information through unreliable networks. The data exchange platform's continuous synchronization feature ensures that data messages are kept up-to-date between network nodes and minimizing the impact of unreliable or slow connections.

The system can include security features such as encryption and authentication measures to protect sensitive data during transmission between nodes, helping mitigate the risks associated with data synchronization in potentially insecure networks. This is essential for maintaining both data integrity and confidentiality while ensuring that only authorized users have access to the synchronized data.

By using a flexible and adaptive solution, it becomes easier to manage and maintain data consistency across large and complex networks. The modular architecture of the data exchange platform and transport plugins enables the system to scale effectively, allowing it to handle increasing numbers of nodes and data without becoming overly resource-intensive or complex.

The use of payload tagged with metadata in the data messages being synchronized enables more efficient and effective data synchronization between nodes in heterogeneous, slow, and unreliable networks by providing additional context and information about each data message being transmitted. This helps reduce unnecessary data transfers and minimize bandwidth usage, which is particularly important in unreliable and slow networks where bandwidth may be limited or inconsistent.

Metadata can also help nodes recover from errors more effectively by providing additional information about the data being synchronized. Metadata can further be used to define custom synchronization rules for different types of data or applications. For example, it may include information about data sensitivity or importance levels, which could be used to prioritize syncing for critical data and ensure that it is propagated more quickly and reliably than less important data.

Metadata helps nodes adapt to differences in data formats or structures across heterogeneous networks by providing a standardized way of describing the data being synchronized. This enables nodes to optimize their syncing behaviour based on the information provided in the metadata and ensures effective exchange and synchronization through the use of appropriate plugins for encoding and decoding. The plugin is responsible for encoding data to suitable format for transport method and when receiving, decoding back to initial format (8-bit binary format). By tagging data messages with metadata, nodes can optimize their syncing behaviour based on the information provided in the metadata.

The present system for efficient data synchronization between multiple network nodes comprises configurable data exchange platform and a set of transport plugins, each adaptable to specific network node requirements. By allowing the data exchange platform to be installed in multiple network nodes and adapting to various network conditions through transport plugins, the system supports diverse synchronization requirements across the communication network.

The system handles increasing numbers of data messages and network nodes by adding new transport plugins to adapt to specific requirements, ensuring that efficient synchronization is maintained as the system grows. The ability of transport plugins to adapt to network node configurations ensures that the data exchange platform remains effective even when network conditions change or when new nodes are added to the communication network. Transport plugins can be designed with security features to protect data messages during transmission and ensure secure data synchronization between nodes, addressing potential vulnerabilities in unreliable networks. By allowing transport plugins to handle specific aspects of data exchange for individual network nodes, the data exchange platform minimizes its computational requirements and reduce overhead, improving overall performance and efficiency in the communication network. Transport plugins provide a way to customize the synchronization process based on various factors (e.g., network topology, available resources) to optimize data exchange for specific use cases or scenarios within the communication network.

The following table presents a list of commands exchanged between a provider and consumers. The transport plugin is the provider, while the transport plugin interface and the synchronization protocol are the consumers. The table further presents directions of flow of the commands, arguments, and a description of the commands.

TABLE-1

| Command | Direction | Argument | Description |
|---|---|---|---|
| Start | To Provider | N/A | Lifecycle control. Signals that transport should acquire/connect to the nodes to be managed. |
| Stop | To Provider | N/A | Lifecycle control. Signals the transport should suspend operation and disconnect from nodes it is using. |
| Drop | To Provider | N/A | Lifecycle control. Signals that the transport will never be used again, and it should release all operating systems resources that are held by it. |

TABLE-1-continued

| Command | Direction | Argument | Description |
|---|---|---|---|
| Send | To Provider | Octets + Metainfo | Commands the provider to send data. |
| Send_Ack | To Consumer | QueueKey | Acknowledge for "send". Give QueueKey to consumer for future reference. |
| Cancel | To Provider | QueueKey | Signals that data transmission must be cancelled if possible |
| Recv | To Consumer | Octets + Metainfo | Hands over received data to consumer. |
| Send_Done | To Consumer | QueueKey | Signals that the indicated transmission was finished successfully. |
| Send_Rejected | To Consumer | QueueKey | Signals that the indicated transmission was not successful. Reasons include a "cancel" command or carrier being too busy. |
| Carrier_Status | To Consumer | CarrierStatus | Real-time information about radio channels. Consumer uses this as a cue if it can send data, and to estimate overall channel congestion. |
| Provider_Status | To Consumer | error Information | Notifies the consumer about the status of the provider. Used as an acknowledge for start/stop commands and to report software errors. |

5 In addition to octets, "send/recv" commands can take optional metadata. This metadata can include, if supported by the provider, a short 8 bit "Header Extension". The Header Extension mechanism is intended for packetized wireless networks, which typically modulate packet headers with more error correction bits than the rest of the packet. This allows 10 the consumer to insert its own signalling information into the header, which will be received even when demodulation of the whole packet fails.

Besides controlling communication flow, the transport plugin interface is responsible for tasks common to all transport plugins, such as payload encryption.

Optionally, configuring the set of transport plugins comprises preparing the communication network plan according to the multiple network nodes, determining one or more network groups, defining one or more transport plugins and accompanying parameters for each network group according to the communication network plan for each network node by the configuration API, and creating one or more channels by the messaging API for the determined one or more network groups. Each network node of the multiple network nodes may be associated with a determined network group and the communication network plan for each network node is prepared based on association of the corresponding network node with the determined network group. The parameters that are defined for a network node are based on the communication network plan that is prepared specifically for the network node.

The transport plugin interface may be configured to provide an indication that allows the synchronization protocol to determine whether there is an opportunity for transmitting one or more data messages, based on information received from the transport plugin. This allows the synchronization protocol to ensure fine-grained routing, ensure that collision is prevented and determine instances for scheduling transmissions using carriers. The transport adaptation layer may be above the communication technology layer and below the application layer. The determinations of instances of data transmissions may be tailored to applications that generate data and communication equipment that transmit the generated data. Additionally, the transport plugin interface may notify the application of timestamp of completion of data transmission, and whether the data transmission was successful (i.e., whether the transmitted data was received by an intended recipient network node). The application may be notified about successes or failures of data transmissions in scenarios where the transport plugin interface relies on media access control algorithms that are configured to detect collisions.

More specifically, configuring the set of transport plugins enables efficiently to synchronize data between multiple nodes. Preparing the communication network plan according to the multiple network nodes comprises determining which network groups each node belongs to and customizing the parameters for each group. Preparing the network plan further comprises taking into account the hardware and the software the network node uses. Preparing the network plan ensures that data is transmitted efficiently between nodes within the same group and increasing reliability. Defining one or more transport plugins and their accompanying parameters for each network group according to the communication network plan helps the data exchange platform adapt to various networking technologies and conditions. Each plugin can be tailored to specific requirements of applications that generate data and communication equipment that transmit it, ensuring effective data transmission and reducing errors caused by unreliable networks. The transport methods enabled by the transport plugins may be for example UDP/IP (multicast, unicast), serial (RS232, UART), Bluetooth (RFCOMM, L2CAP). Creating one or more channels for the determined network groups enables efficient message exchange between nodes within a group. By doing so, the data exchange platform minimizes the overhead involved in managing multiple connections and ensures that each connection is used optimally to transmit data, resulting in improved throughput and faster synchronization times.

The data exchange platform of the first network node is configured to identify the one or more second network nodes requesting to synchronize the one or more data messages and the one or more data messages to be synchronized. In some embodiments, identifying the one more data messages, to be synchronized, comprises identifying one or more missing fragments of the one or more data messages to be synchronized. This enables the data exchange platform to detect and address discrepancies caused by missing, partial, or incorrectly delivered data fragments. This ensures data consistency across all network nodes, even in challenging network conditions and improves overall network performance. The one or more missing fragments refers to the one or more data messages to be synchronized that is requested by one or more second network nodes, wherein the data is viewed as fragments.

In some embodiments, the data exchange platform may be configured so that the synchronization requests are sent out after predefined intervals. The data exchange platform may receive one or more requests from the one or more second network nodes to synchronize the one or more data messages by transferring the one or more data messages to the one or more second network nodes. The one or more requests may be received if data is not synchronized between the multiple network nodes of the communication network. The data may not be synchronized if the one or more fragments of the one or more data messages to be synchronized are missing, partially or incorrectly delivered to the one or more second network nodes. The one or more missing fragments may be missing from one or more applications or storage mediums of the one or more second network nodes. The identification of the one or more missing fragments of the one or more data messages and the transfer of the one or more missing fragments may lead to the achievement of synchronization of the one or more data messages.

The one or more missing fragments may be identified in an event of a partial delivery of the one or more data messages. This is because a subset of a set of fragments of the one or more data messages may be delivered to the one or more second network nodes, while other fragments of the one or more data messages, constituting the one or more missing fragments, may not be delivered, or delivered with errors. Once the one or more missing fragments of the one or more data messages are identified, synchronization may be initiated. The synchronization may be initiated for the delivery of the one or more missing fragments to the one or more second network nodes.

Optionally, identifying, the one or more second network nodes requesting to synchronize the one or more data messages and the one or more data messages to be synchronized, comprises incrementally estimating, that the first network node has the one or more missing fragments locally, but the identified one or more second network nodes do not; and broadcasting the one or more missing fragments to the identified one or more second network nodes. The one or more missing fragments refers to the subset of the sparse bytearray (F). The incrementally estimating the subset S is based on compressed versions of F(x). Level-1 compressed version of F is defined as $$FC(1;x)=H(F([xN;xN+N-1])),$$

where $H(\cdot)$ is a cryptographic hash function and "N" is a hyperparameter. For example, values of "N", representing the fragment size, may be in the range 10-5000, but less than maximum transmission unit (MTU) minus metadata size. Optimal is ¼-½ of the MTU. A level-k compressed version of "F(x)" is defined as $$FC(k;x)=H(FC(k-1;[xM;xM+M-1])).$$

Incremental estimation enables the first network node to determine that it holds some missing data fragments locally, while the identified second network nodes do not. This crucial for efficient synchronization between network nodes. By performing incremental estimations, the first network node can prioritize the transfer of essential data fragments to the second network nodes, reducing the overall time required for synchronization and minimizing potential delays. This allows nodes to adapt to changing network conditions and quickly recover from data loss or miscommunications. Incremental estimation enables the synchronization protocol to focus on transmitting missing pieces rather than transferring entire messages unnecessarily, contributing to more efficient and effective data synchronization between multiple nodes. By performing the incremental estimation, the synchronization protocol ensures efficient communication between neighboring network nodes in unreliable and slow networks.

When one or more data messages need to be synchronized between the first network node and several second network nodes, the data exchange platform determines that the data messages are stored on the first node but not in the identified second network nodes based on their synchronization requests. Upon detecting these discrepancies, the first node checks its local memory to confirm that it indeed holds the missing fragments. The synchronization protocol facilitates the transfer of these data messages between nodes as necessary. The platform initiates the transfer once it determines that the second network nodes have not received or incorrectly received the data messages based on their requests. This transfer is enabled by transport plugins that handle the interface for data message transportation.

The one or more missing fragments may be broadcasted to the one or more second network nodes. The one or more second network nodes may be neighboring network nodes of the first network node. In such case, the synchronization takes place between neighboring nodes. The data exchange platform determines that the one or more data messages are stored in the first network node of the communication network. Furthermore, the data exchange platform determines that the one or more data messages are not stored in the one or more second network nodes. The determination may be based on the reception of the one or more requests from the one or more second network nodes for the synchronization.

The data exchange platform of the first network node may manage transfer of data messages between the multiple nodes of the communication network. The first network node may, thus, store the one or more data messages. Therefore, after the reception of the one or more requests from the one or more second network nodes, for the one or more data messages, the data exchange platform may check a memory of the first network node to retrieve the one or more data messages to be synchronized. The data exchange platform may further determine that the one or more second network nodes have not received the one or more data messages, and, by extension, that the one or more data messages are not stored in the one or more second network nodes. This is because the data exchange platform may not have received the one or more requests had the one or more second network nodes received the one or more data messages correctly.

The synchronization protocol is implemented for continuously synchronizing the one or more data messages between the first network node and the one or more second network nodes. The one or more data messages are synchronized by transferring the one or more data messages from the first network node to the one or more second network nodes which requested the one or more data messages. The one or more data messages to be synchronized are transferred to the one or more second network nodes by use of the synchronization protocol stored in the data exchange platform. The transfer of the one or more data messages is triggered based on determination of a non-reception or an erroneous reception of the one or more data messages by the one or more second network nodes. The determination of the non-reception or the erroneous reception of the one or more data messages is based on the one or more requests. The one or more requests may indicate that the one or more fragments of the one or more data messages, received by the one or mode second network nodes, are missing. Based on the received one or more requests, the data exchange platform of the first network node may determine that the one or more second network nodes have either not received the one or more data messages or the one or messages have been received erroneously. Based on the determination, the transfer of the one or more data messages to be synchronized is initiated. The transfer may be facilitated by the transport plugins that drive the transport plugin interface.

It may be noted that the synchronization protocol can be used to transfer data messages to any network node of the multiple network nodes of the communication network. A data message of the one or more data messages to be transferred to the one or more second network nodes is a short sequence of application-specific binary data (for example, 100-1000 bytes). The data message may be referred to as a payload. The payload may be tagged with metadata that indicates how the data message is required to be transmitted to one or more second network nodes. Optionally, the one or more second network nodes, to which the one or more data messages is required to be transferred, may be identified. Identifying the one or more second network nodes to which the one or more data messages are to be transferred, is based on one or more of the following: a channel identifier, an object identifier, a creation timestamp, an expiration timestamp, or a priority class. These metadata tags attached to each data message aid in determining the intended one or more recipients based on various criteria. These features contribute to more efficient data synchronization between multiple nodes by allowing targeted delivery of data messages based on their specific metadata, reducing unnecessary transmissions and minimizing the impact of unreliable network conditions. A channel identifier allows associating data messages with specific applications, simplifying communication between different applications running on the middleware platform. This identification can also be used for routing data messages to their respective application-defined topics. An object identifier helps link data messages with external objects or units, enabling efficient real-time tracking and management of those entities across the network. A creation timestamp is utilized to filter or prioritize data messages based on their age, ensuring that older messages are not unnecessarily transmitted in unreliable networks. Expiration timestamps are employed to manage message lifetimes, reducing the load on communication networks and improving information security by discarding outdated messages. Priority classes allow for configurable prioritization policies when transferring data messages between nodes, ensuring that critical data is delivered first even in slow or unreliable networks.

In an embodiment, the metadata tagged to each of the one or more data messages may include a channel identifier, an object identifier, a creation timestamp, an expiration timestamp, and a priority class. The metadata tagged to each of the one or more data messages may indicate the one or more second network nodes to which the one or more data messages is required to be transferred or delivered. Therefore, based on the tagged metadata, the one or more second network nodes may be identified.

Subsequently, the synchronization protocol may be used to transfer the one or more data messages to the one or more second network nodes.

The channel identifier tagged to a data message indicates an application with which the data message may be associated (for example, the data message may be generated by the application). Furthermore, the channel identifier may be used to group data messages based on application-defined topics (for example, chat groups in chat applications). The object identifier tagged to the data message may be used to associate the data message with an external object identifier. For example, real-time location tracking of a set of objects or units on a particular channel may be actualized using the object identifier. The creation timestamp tagged to a data message may indicate a time instance of creation of the data message. Based on the creation timestamp, the data exchange platform may filter or prioritize transfer of the data message. The expiration timestamp tagged to a data message indicates a time instance of expiry of the data message. The expiration timestamp may facilitate reduction of load on the communication network and/or improvement in information security. After elapsing of a time instance that corresponds to the expiry timestamp of the data message, the data message may not be delivered to the network nodes of the multiple network nodes. The priority class tagged to a data message, the creation timestamp, and the expiry timestamp may be used for setting a configurable prioritization policy for transferring the data message.

It may be noted that applications installed in the network nodes of the communication network use the synchronization protocol to transmitting created data messages and indicate interest in receiving data messages that are associated with a certain channel. The synchronization protocol ensures that data messages are transferred to intended recipient network nodes. The transfer may be ensured even if topology of the communication network changes or and/or data links to be used for the transfer of the data messages are unreliable.

Optionally, implementing the synchronization protocol comprises dividing the identified one or more data messages, to be synchronized, into equally sized data fragments, transforming the equally sized data fragments into fixed-size hash values of the Merkle tree on a sparse bytearray by applying a hash function to each data fragment of the equally sized data fragments, storing the fixed-size hash values in the AMQ filter, and broadcasting the AMQ filter to the identified one or more second network nodes. The the sparse bytearray is defined as $F: A \rightarrow [0;255] \cup \{\xi\}$, where a subset A is a subset of natural numbers, $[0;255] \cup \{\xi\}$ is a 8-bit alphabet extended with a special null character $\xi$ and the data message corresponds to a contiguous subset $m \subset A$. A hash function may be applied on each fragment of each of the one or more data messages to obtain a hash value corresponding to each fragment of each of the one or more data messages. The hash value corresponding to each fragment of each of the one or more data messages is stored in the AMQ filter, which may be broadcasted to the one or more second network nodes. The transferring of the one or more data messages to the one or more second network nodes is based on the broadcasting.

More specifically, the hash function is applied to each fragment of every identified data message, generating a corresponding hash value for each fragment of each data message. The hash values are then stored in the AMQ filter and broadcasted to all identified second network nodes. This process enables efficient data synchronization between multiple nodes. Dividing data messages into equally sized fragments enables to break the large data messages down into smaller, manageable fragments, the data exchange platform reduces the time required for synchronizing data between nodes and makes the synchronization process more efficient. Transforming data fragments into fixed-size hash values enables to apply a hash function to each fragment, which converts the variable-sized data into fixed-sized hash values. This is essential for the effective use of AMQ filters, which rely on fixed-size data to maintain their indexes and support fast querying. Storing hash values in an AMQ filter allows efficient storage and retrieval of large amounts of data while minimizing the required storage space. It also supports fast querying for missing or out-of-order fragments, making it a valuable tool for maintaining data synchronization in unreliable and slow networks. Broadcasting the AMQ filter to second network nodes enables to distribute the AMQ filter across all identified second network nodes, the data exchange platform ensures that each node has access to the most up-to-date information about the state of the data messages and their corresponding hash values. This enables efficient data transfer based on the information available in the AMQ filter instead of having to transmit entire data messages unnecessarily.

Optionally, implementing the synchronizing protocol further comprises encoding a first part of metadata for determining a priority of each data fragment of the equally sized data fragments of data, evaluating a second part of the metadata and the payload; and mapping the metadata to subsets by priorities. The first part of metadata tagged to each of the one or more data messages may be encoded based on priorities of each of the one or more data messages. A second part of the metadata tagged to each of the one or more data messages and a payload of each of the one or more data messages may be evaluated. The synchronization protocol encodes the first part of the metadata, evaluates the second part of the metadata, and evaluates the payload to facilitate the transfer of each data message of the one or more data messages.

This helps to optimize data transfer by prioritizing more important fragments over less critical ones. To facilitate efficient transfer of data between network nodes, a fragmentation and synchronization function is used to calculate the left boundary of each data message with a priority value, based on a priority-encoded subset A. The synchronization protocol evaluates the second part of the metadata and the payload for each fragment using this function, which can be implemented as a Merkle tree construction with N-ary leaf nodes and M-ary internal network nodes. By continuously synchronizing the Merkle tree, the synchronization protocol is able to estimate the data subset m that is available locally in a given node. This information allows the broadcast of missing substrings of F to neighboring nodes, enabling them to determine which parts of their Merkle trees are different or missing compared to other nodes. The missing substrings refers to missing fragments but with fragments viewed as array of bytes.

In an embodiment, to facilitate the transfer of a data message of the one or more data messages to a second network node of the one or more second network nodes, the data message may be transformed based on a mathematical function. The mathematical function is of the form F: $A \rightarrow [0;255] \cup \{\xi\}$. Herein, "A" is a subset of natural numbers, and $[0;255] \cup \{\xi\}$ is an 8-bit alphabet that is extended with a special null character "$\xi$". The data message corresponds to a contiguous subset "m" (i.e., $m \cup A$). A left boundary of "m" may encode the first portion of metadata, tagged to the data message. The first portion of the metadata indicates priority of the data message. Further, a function "F(x)", "x" $\in$ "m", evaluates the second portion of the metadata and the payload of the data message created by an application. The metadata of the data message is mapped to subsets of "A" such that data messages with higher priority are mapped to numerically higher values (as "A" is a subset of natural numbers).

Optionally, the sparse byte array may be synchronized in a back-to-front manner. Synchronizing the sparse byte array "F(x)" in a back-to-front manner helps improve efficiency and reduce potential delays in unreliable and slow networks. The synchronization protocol estimates locally available subsets ("m") based on compressions and broadcasts missing parts of function "F" to neighbors. A Merkle tree with N-ary leaf nodes and M-ary internal network nodes is used, along with an AMQ filter for efficient broadcasting and determining differences or missing fragments between networks. This results in reduced bandwidth requirements and overall improvement in synchronization efficiency.

Thus, a problem of synchronizing the one or more data messages may be transformed into a problem of synchronizing a sparse byte array "F(x)" in a "back-to-front" manner. The function "F" and its domain "A" may be referred to as "axis". The synchronization protocol may incrementally estimate "m" (i.e., $m \cup A$) for which data is available locally (i.e., the $F_{local}(m) \neq \xi$). This is because of the determination that the one or more data messages are stored in the first network node and the determination that the one or more data messages are not stored in the one or more second network nodes (i.e., $F_{peer}(m)=\xi$). The synchronization protocol stored in the first network node) may facilitate the broadcast of missing substrings of "F" to its neighboring one or more second network nodes.

In an embodiment, the estimation of "m" may be based on compressed versions of "F(x)". A level-1 compressed version of "F(x)" is defined as Fc(1; x). Herein, $$Fc(1;x) = H(F([xN;xN+N-1])),$$

H($\cdot$) is a cryptographic hash function and "N" is a hyperparameter. For example, values of "N", representing the fragment size, may be in the range 10-5000, but less than maximum transmission unit (MTU) minus metadata size. Optimal is ¼-½ of the MTU. A level-k compressed version of "F(x)" is defined as $$Fc(k;x) = H(Fc(k-1;[xM;xM+M-1])).$$

In other words, this is a Merkle tree construction on the array of bytes "F(x)" with N-ary leaf nodes and M-ary internal network nodes. The synchronization protocol may continuously synchronize the entire Merkle tree, which may dynamically vary. The hash value corresponding to each equally sized data fragment of each of the one or more data messages may be stored in a Merkle tree. The Merkle tree is stored on the sparse byte array that is synchronized in a back-to-front manner.

In an embodiment, the synchronization protocol is configured to select some nodes of the Merkle Tree, encode hash of each immediate successor node of each of the selected nodes in a AMQ filter, and broadcast the AMQ filter to the one or more second network nodes that are neighbors of the first network node. This allows each second network node of the one or more second network nodes to determine parts of a Merkle tree of the corresponding second network node that may be different or missing, compared to the Merkle tree of the first network node or Merkle trees of other second network nodes. Thus, each second network node of the one or more second network nodes may estimate an upper-bound estimate of "m". The parts of the Merkle tree that are missing may correspond to the one or more missing fragments of the one or more data messages, which are not stored in the corresponding second network node. The parts of the Merkle tree that are different may correspond to one or more fragments of the one or more data messages that have been erroneously delivered to the corresponding second network node, and which may be required to be corrected.

The AMQ filter is a space-efficient data-structure that may support a set of membership queries. It may be noted that bandwidth required for transmitting the AMQ filter built based on "N" data messages (i.e., the outputs of "H(.)") to the one or more second network nodes is significantly less bits compared to a plain list of the "N" data messages. Optionally, the AMQ filter may be selected from a group of filters comprising a Bloom filter, a Cuckoo filter, or an XOR filter.

The Bloom Filter is a space-efficient probabilistic data structure designed to test whether an element is a member of a set, offering a certain false positive rate but no false negatives. It employs multiple hash functions to map each data message to several positions in a fixed-size bit array, setting the bits at these positions. The advantages of a Bloom Filter include its compact space usage and rapid insertion and query operations, making it ideal for large data sets and scenarios where false positives are acceptable but space and speed are at a premium. The Bloom Filter helps solve the data synchronization by allowing nodes to efficiently test for set membership without transmitting large amounts of data. False positives can be tolerated in unreliable and slow networks, reducing the need for extensive data exchange.

The Cuckoo Filter is an advancement over the Bloom Filter that achieves better space efficiency and a lower false positive rate. It operates on the principle of cuckoo hashing, where each data message is hashed to two possible locations, and inserting a new data message can displace an existing one to its alternate location. This dynamic allows for efficient data message deletion, a significant advantage over Bloom Filters. The benefits of Cuckoo Filters include their reduced memory footprint and enhanced false positive performance, making them particularly suited for applications that demand high insertion rates and minimal false positives.

The Cuckoo Filter contributes to efficient data synchronization between nodes by offering a lower false positive rate compared to Bloom Filters. Its dynamic nature allows for efficient data message displacement and deletion, which is crucial when dealing with unreliable and slow networks that may result in network partitions or data loss.

An XOR Filter is a probabilistic data structure that utilizes bitwise XOR operations to determine set membership, offering an improvement in memory efficiency and false positive rates compared to Bloom and Cuckoo Filters. While the size of an XOR Filter does increase with the number of elements it contains, it remains significantly memory-efficient, providing an advantageous balance between space usage and performance. XOR Filters are known for their operational simplicity and efficiency in lookups and insertions, rendering them an excellent choice for environments where memory resources are constrained or where superior false positive rates are desired. The XOR Filter addresses the problem of synchronizing data efficiently between multiple nodes by providing a constant memory usage regardless of the number of elements it stores. This feature is particularly valuable for unreliable and slow networks where memory resources are limited, allowing for more efficient synchronization processes with minimal overhead.

For example, bandwidth required for Bloom filter is $1.44N \log (\in)$ bits, "$\in$" is a false positive rate. In an embodiment, the bandwidth requirement for broadcasting the AMQ filter enables usage of space-efficient schemes such as a non-binary generalization of XOR+filter that is encoded with a renormalization-based Asymmetric Numerical System (rANS) entropy coder.

In another aspect, the present disclosure provides a database replication method implemented in a communication network, utilizing the method according to the embodiments of the present method. The database replication method enhances data synchronization efficiency between multiple network nodes in unreliable and slow networks by leveraging various optimizations such as incremental estimation, back-to-front synchronization, and AMQ filters. By implementing incremental estimation and back-to-front synchronization, the database replication method minimizes the amount of data that needs to be transmitted between nodes, reducing overall network load and improving synchronization efficiency. Utilizing AMQ filters like Bloom Filters, Cuckoo Filters, or XOR Filters helps minimize storage and transmission requirements while maintaining acceptable false positive rates. The use of metadata tags such as channel identifier, object identifier, creation timestamp, expiration timestamp, and priority class enables more targeted data synchronization between nodes based on specific criteria. The ability to identify target recipient network nodes based on multiple factors ensures efficient data synchronization even when the topology of the communication network changes or data links become unreliable. The database replication method is designed to ensure that data messages are transferred to intended recipient network nodes, even in the presence of network failures or security threats. These technical effects and advantages contribute significantly to more efficient and robust database replication between multiple nodes in unreliable and slow networks, ensuring high availability and consistent data across the entire system.

In yet another aspect, data exchange platform for synchronizing a data message between multiple network nodes of a communication network, the data exchange platform comprising instructions which, when the data exchange platform is executed by a first network node and one or more second network nodes, cause the data exchange platform to synchronize the one or more data messages according to the embodiments of the present method. The data exchange platform allows for multiple synchronization techniques, enabling network nodes to adapt to changing network conditions or specific use cases (e.g., incremental estimation, back-to-front synchronization, AMQ Filters). By employing optimized synchronization techniques, the data exchange platform can minimize storage requirements and reduce network traffic by only transmitting necessary information between nodes. The use of metadata tags (channel identifier, object identifier, creation timestamp, expiration timestamp, priority class) enables targeting specific data messages to intended recipients based on various criteria, ensuring efficient communication. The data exchange platform's synchronization techniques help maintain consistency and availability of data even when dealing with network failures or security threats.

The data exchange platform is configured to handle large volumes of data messages while maintaining efficiency and reliability, making it suitable for applications that require high throughput, low latency and reliable data delivery in unreliable networks in unreliable networks. By implementing efficient synchronization techniques, the data exchange platform expedites fault recovery when network connections are interrupted or disconnected, ensuring minimal downtime and data inconsistencies. The data exchange platform can be configured to interact with various applications and communication protocols, making it compatible with diverse systems and use cases in unreliable and slow networks.

The present disclosure provides a computer program product comprising the data exchange platform according to the embodiments of the present disclosure, wherein the data exchange platform is stored on a computer-readable carrier or wherein the data exchange platform is downloadable and installable on multiple network nodes of a communication network. The computer program product comprising the data exchange platform as either on a physical carrier or a downloadable and installable package for multiple network nodes in a communication network contributes to efficient data synchronization between multiple network nodes in unreliable and slow networks through the following technical effects and advantages. A downloadable and installable data exchange platform allows network nodes in the communication network to update or upgrade their synchronization capabilities as needed, ensuring compatibility with newer optimizations and features. Providing the data exchange platform on a physical carrier simplifies the initial deployment process for new network nodes joining the communication network, reducing setup times and enabling faster synchronization of data messages. By providing a downloadable solution, organizations can avoid the cost of procuring and distributing physical media for each new node joining the communication network. The downloadable data exchange platform allows network nodes to easily install and configure the synchronization software without requiring on-site support or extensive expertise in software deployment. Distributing the data exchange platform as a computer program product enables easy integration into new communication networks, making it easier for organizations to expand their network infrastructure or add new members while maintaining efficient data synchronization between network nodes. Downloading and installing the data exchange platform from a trusted source ensures that network nodes receive an authentic and secure copy of the software, reducing the risk of introducing malware or unauthorized modifications into the communication network.

In a seventh aspect, the present disclosure provides a distributed database system within a communication network comprising multiple network nodes, wherein the distributed database system is formed of a data exchange platform provided by the present disclosure in the third aspect, and when the data exchange platform is executed in the multiple network nodes, the distributed database system is configured to utilize the data exchange platform to at least one of: detect and monitor availability status of each network node of the multiple network nodes;

queue and forward data retrieval requests to offline nodes upon their recovery; synchronize data across the multiple network nodes; and maintain data availability when one or more network nodes of the multiple network nodes are offline.

In an embodiment, the data exchange platform comprising a messaging Application Programming Interface (API), a transport plugin interface, and a synchronization protocol with a transport adaptation layer comprising an Approximate Membership Query (AMQ) filter is arranged to act as a distributed database system. This is essential when the network nodes are offline for extended periods of time and need resynchronization when reconnected. Additionally, the distributed database system allows to avoid single points of failure. The data messages can be distributed to many network nodes and impact is minimum if some go offline.

The distributed database system within the communication network comprising multiple network nodes utilizes the data exchange platform according to the present disclosure to efficiently manage data synchronization between network nodes in the communication network by offering the following technical effects and advantages. Continuous availability detection of network nodes ensures that the distributed database system remains aware of each network node's status, allowing for real-time reaction to failures or connectivity issues and enabling efficient data synchronization between operational nodes. Queuing and forwarding data retrieval requests to offline network nodes upon their recovery helps ensure that all data is eventually synchronized across the communication network, maintaining data consistency even when dealing with intermittent connectivity or node failures. Efficient data synchronization between multiple network nodes is achieved by utilizing the data exchange platform's optimization techniques such as incremental estimation, back-to-front synchronization, and AMQ Filters. The distributed database system can maintain data availability even when one or more network nodes are offline by relying on other synchronized network nodes to serve queries and ensuring that data synchronization is resumed once the offline network node comes back online. By prioritizing data transfer based on metadata tags such as channel identifier, object identifier, creation timestamp, expiration timestamp, and priority class, the distributed database system minimizes unnecessary data transmission between network nodes, reducing overall network traffic and improving synchronization efficiency. The distributed database system can provide real-time data access and response times by leveraging optimized synchronization techniques that maintain consistent data across multiple network nodes in the communication network. The ability to efficiently manage data synchronization between a large number of network nodes in the distributed database system allows it to adapt to expanding or changing network configurations while maintaining high availability and consistency of stored data.

DETAILED DESCRIPTION OF THE DRAWINGS

Referring to FIG. 1, there is shown a system architecture and synchronization method for synchronizing one or more data messages between multiple network nodes of a communication network, in accordance with an example of the embodiments of the present disclosure. The system 100 comprises a data exchange platform 102 and a set of transport plugins 114 installed in a first network node 104 of the communication network and in two second network nodes 106a and 106b of the communication network. The data exchange platform 102 is configured to continuously synchronize the one or more data messages between the first network node 104 and second network node 106a and between the first network node 104 and second network node 106b. Each transport plugin of the set of transport plugins 114 is configured to adapt the data exchange platform 102 for the first network node b and second network nodes 106a, 106b. The data exchange platform installed to the first network node 104 and to the second network nodes 106a, 106b comprises a messaging Application Programming Interface, API 108, a transport plugin interface 110, a synchronization protocol 112 with a transport adaptation layer comprising an Approximate Membership Query (AMQ) filter.

In an example, the data exchange platform 102 of the second network node 160a acts as a requesting party and sends an AMQ filter 120 comprising one or more data messages to the sending party, i.e., to the data exchange platform 102 of the first network node 104 and requesting to synchronize the one or more data messages. The data exchange platform 102 of the first network node 104, when received AMQ filter 120 with the request to synchronize the one or more data messages then compares whether it has the one or more data messages to be synchronized. If the data exchange platform 102 of the first network node 104 identifies that it has the requested one or more data messages to be synchronized it provides corresponding one or more data messages 122 to the data exchange platform 102 of the second network node 160a.

In another example, if the data exchange platform 102 of the first network node 104 identifies that it does not have the requested one or more data messages to be synchronized, the data exchange platform 102 of the first network node 104 may send an AMQ filter 130 comprising one or more data messages to be synchronized to the data exchange platform 102 of the another second network node 106b and request to synchronize the one or more data messages. The data exchange platform 102 of the second network node 106b identifies that it has the requested one or more data messages to be synchronized and provides corresponding one or more data messages 132 to the data exchange platform 102 of the second network node 160a.

The synchronization protocol is implemented to continuously synchronize the one or more data messages between the first network node and the one or more second network nodes by transferring the one or more data messages from the first network node to the one or more second network nodes which are neighbours of the first network node. The one or more second network nodes requested the one or more data messages to be synchronized.

Figure 2:
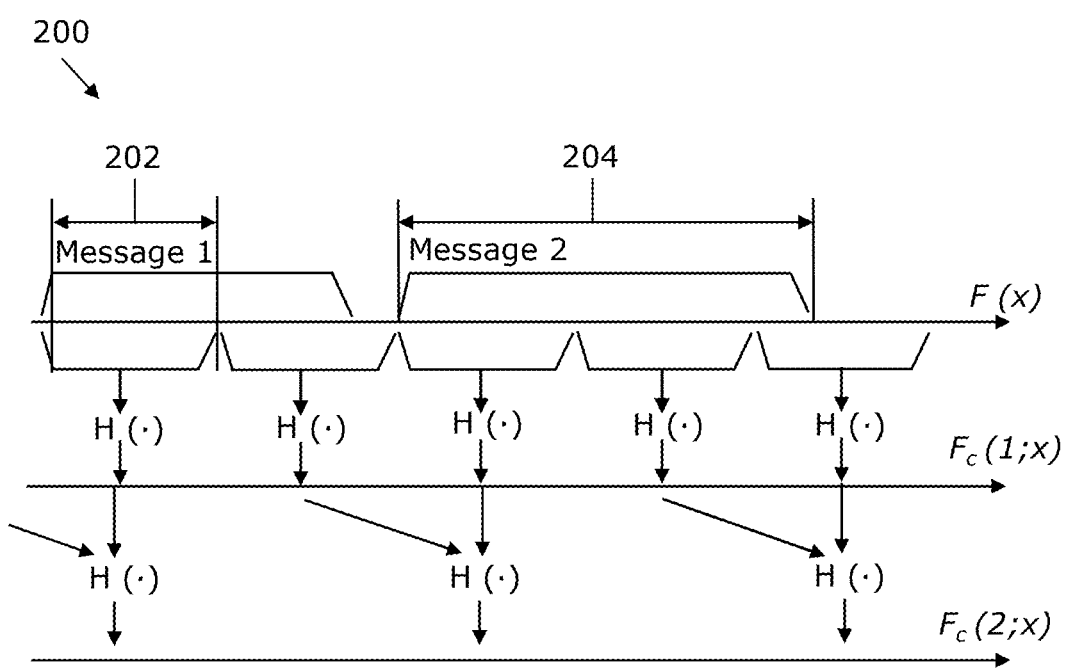
FIG. 2 is an exemplary scenario that illustrates splitting of data messages into fragments and application of a hash function on the fragments for synchronization of the data messages, in accordance with an embodiment of the present disclosure.

Referring to FIG. 2, which is an exemplary scenario 200 that illustrates splitting of data messages into fragments and application of a hash function on the fragments for synchronization of the data messages, in accordance with an embodiment of the present disclosure. The data messages are a first data message 02, i.e., Message-1, and a second data message 204, i.e., Message-2. Each of the first data message 202 and the second data message 204 may be required to be transferred from the second network node 106a to a first network node 104 for synchronization. In such an instance, the synchronization protocol 112 is arranged to segment the first data message 202 and the second data message 204, that are required to be transferred, into multiple equally sized data fragments. A hash function "H(.)" is applied on each data fragment of each of the first data message 202 and the second data message 204 for obtaining a hash value corresponding to each data fragment. The hash values corresponding to each data fragment are stored in an AMQ filter. The AMQ filter may be broadcasted to the second network node 106b for achieving the synchronization. In an embodiment, based on the hash value corresponding to each data fragment, compressed versions of "F(x)", such as "Fc(1; x)", "Fc(2; x)", and so on, may be obtained. Herein, "F(x)" represents the data fragments of each of the first data message 202 and the second data message 204. The compressed versions of "F(x)" may be used for obtaining the AMQ filter, which is broadcast to the second network nodes for achieving the synchronization.

Figure 3:
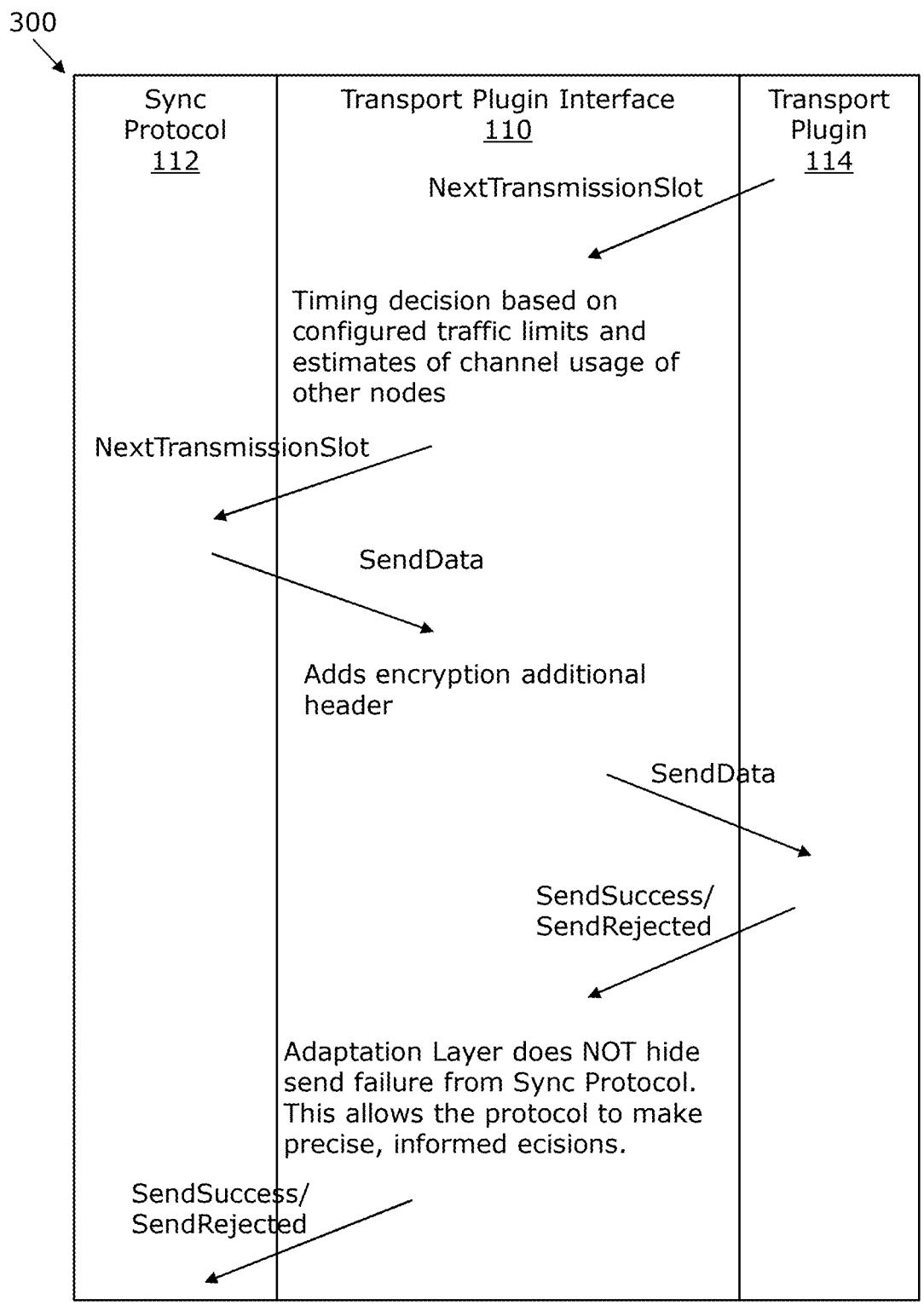
FIG. 3 illustrates exemplary interactions between a synchronization protocol and a transport plugin, in accordance with various embodiments of the present disclosure.

Referring to FIG. 3, there is illustrated exemplary interactions 300 between a synchronization protocol 112 and a transport plugin 114 for scheduling data transmissions and notifying status of data transmissions. The one or more data messages may be transferred to the one or more second network nodes by use of the transport plugin interface 110. The transport plugin 114 may provide an indication, "Next-TransmissionSlot" to the transport plugin interface 110. The indication may be provided based on a determination that data traffic in one or more transmission channels, to be used for transmission of the one or more data messages, is within traffic limits. The indication may be provided further based on estimates of channel usage by other second network nodes (apart from the second network node 106b). The transport plugin interface 110 may forward the indication to the synchronization protocol 112 to determine whether to initiate transfer of the one or more data messages. Based on the received indication, the synchronization protocol 112 may determine that the one or more data messages can be transferred provide an indication "SendData" to the transport plugin interface 110 to transfer the one or more data messages to the one or more second network nodes. The transport plugin interface 110 may add an additional encryption header for encrypting the one or more data messages to be transmitted. Furthermore, the transport plugin 114 may provide an indication, i.e., "SendSuccess" or "SendRejected" to the transport plugin interface 110. The transport plugin interface 110 may forward the indication to the synchronization protocol 112. Based on the received indication, the synchronization protocol 112 may determine whether the transfer of the one or more data messages to the one or more second network nodes was successful. This may allow the synchronization protocol 112 to schedule transmission of the one or more data messages such that probability of successful transmission of the one or more data messages increases.

The invention claimed is:

1. A computer-implemented method for synchronizing one or more data messages between multiple network nodes of a communication network, wherein the multiple network nodes comprise a first network node and one or more second network nodes and wherein the one or more data messages to be synchronized comprises a payload tagged with metadata, the method comprises:

installing a data exchange platform from a storage medium in the first network node and in the one or more second network nodes according to a communication network plan, wherein the data exchange platform comprises a messaging Application Programming Interface, API, a transport plugin interface, a synchronization protocol with a transport adaptation layer comprising an Approximate Membership Query, AMQ, filter and a Merkle tree;

providing a set of transport plugins, activated and configured by a pre-defined configuration, to at least one network node of the multiple network nodes;

identifying, by the data exchange platform of the first network node, the one or more second network nodes requesting to synchronize the one or more data messages and the one or more data messages to be synchronized; and implementing the synchronization protocol for continuously synchronizing the one or more data messages between the first network node and the one or more second network nodes by transferring the one or more data messages to be synchronized from the first network node to the identified one or more second network nodes which requested the one or more data messages.

2. The method according to claim 1, wherein configuring the set of transport plugins comprises:
preparing the communication network plan according to the multiple network nodes;
determining one or more network groups;
defining one or more transport plugins and accompanying parameters for each network group according to the communication network plan for each network node by a configuration API; and
creating one or more channels by the messaging API for the determined one or more network groups.

3. The method according to claim 1, wherein identifying the one more data messages to be synchronized comprises identifying one or more missing fragments of the one or more data messages to be synchronized.

4. The method according to claim 1, wherein
implementing the synchronization protocol comprises:
dividing the identified one or more data messages, to be synchronized, into equally sized data fragments;
transforming the equally sized data fragments into fixed-size hash values of the Merkle tree on a sparse byte array by applying a hash function to each data fragment of the equally sized data fragments;
storing the fixed-size hash values in the AMQ filter; and
broadcasting the AMQ filter to the identified one or more second network nodes.

5. The method according to claim 1, wherein
implementing the synchronizing protocol further comprises:
encoding a first part of metadata for determining a priority of each data fragment of the equally sized data fragments;
evaluating a second part of the metadata and the payload; and
mapping the metadata to subsets by priorities.

6. The method according to claim 1, wherein identifying, the one or more second network nodes requesting to synchronize the one or more data messages and the one or more data messages to be synchronized, comprises incrementally estimating, that the first network node has the one or more missing fragments locally, but the identified one or more second network nodes do not; and broadcasting the one or more missing fragments to the identified one or more second network nodes.

7. The method according to claim 1, wherein the sparse byte array is synchronized in a back-to-front manner.

8. The method according to claim 1, wherein the method further comprises selecting the AMQ Filter from a group comprising: a Bloom Filter, a Cuckoo Filter, or a XOR Filter.

9. The method according to claim 1, wherein identifying, the one or more second network nodes to which the one or more data messages to be synchronized to transfer is based on one or more of the following: a channel identifier, an object identifier, a creation timestamp, an expiration timestamp, or a priority class.

10. A database replication method implemented in a communication network, utilizing the method according to claim 1.

11. A data exchange platform for synchronizing a data message between multiple network nodes of a communication network, the data exchange platform comprising instructions which, when the data exchange platform is executed by a first network node and one or more second network nodes, cause the data exchange platform to synchronize the one or more data messages according to the method of claim 1.

12. A system for synchronizing one or more data messages between multiple network nodes of a communication network, the system comprising a data exchange platform installable in the multiple network nodes of the communication network and a set of transport plugins installable in the multiple network nodes of the communication network, wherein the data exchange platform is configured to continuously synchronize the one or more data messages between the multiple network nodes of the communication network and each transport plugin of a set of transport plugins is configured to adapt the data exchange platform for the multiple network nodes.

13. A computer program product comprising a data exchange platform according to claim 11, stored on a non-transitory computer-readable carrier.

14. A computer program product comprising a data exchange platform according to claim 11, downloadable and installable on multiple network nodes of a communication network.

15. A distributed database system within a communication network comprising multiple network nodes, wherein the distributed database system is formed of a data exchange platform according to claim 11, and when the data exchange platform is executed in the multiple network nodes, the distributed database system is configured to utilize the data exchange platform to at least one of:
detect and monitor availability status of each network node of the multiple network nodes;
queue and forward data retrieval requests to offline nodes upon their recovery;
synchronize data across the multiple network nodes; and
maintain data availability when one or more network nodes of the multiple network nodes are offline.

* * * * *